United States Patent [19] | [11] 3,993,091
Loveless | [45] Nov. 23, 1976

[54] MANIFOLD AND VALVE SYSTEM

[75] Inventor: Stanley M. Loveless, Oshtemo Township, Kalamazoo County, Mich.

[73] Assignee: General Gas Light Company, Kalamazoo, Mich.

[22] Filed: Oct. 6, 1975

[21] Appl. No.: 619,815

[52] U.S. Cl. ................................ 137/269; 137/271; 137/608; 251/367

[51] Int. Cl.$^2$ .................. F16K 11/02; F16K 77/00; F15C 3/04

[58] Field of Search .................. 137/269, 271, 608; 251/366, 367; 235/201 ME

[56] References Cited

UNITED STATES PATENTS

| | | | |
|---|---|---|---|
| 3,354,894 | 11/1967 | Stoll | 137/269 X |
| 3,407,834 | 10/1968 | Brandenberg | 137/271 |
| 3,521,850 | 7/1970 | German | 137/271 X |
| 3,548,849 | 12/1970 | Purcell | 137/608 X |
| 3,625,250 | 12/1971 | Flaschar | 137/271 X |
| 3,707,163 | 12/1972 | Hugler | 137/271 |
| 3,747,628 | 7/1973 | Holster | 137/269 |
| 3,881,513 | 5/1975 | Chang | 137/271 X |
| 3,915,194 | 10/1975 | Friedrich | 137/271 X |

*Primary Examiner*—Martin P. Schwadron
*Assistant Examiner*—Miller Robert J.
*Attorney, Agent, or Firm*—Woodhams, Blanchard and Flynn

[57] ABSTRACT

A fluid control apparatus comprising a manifold and one or more valve assemblies adapted to be mounted on the manifold for controlling the flow of a pressure fluid. The manifold has a pair of main flow passages associated therewith, one being a supply passage and the other being a discharge or exhaust passage. A pair of load ports is provided in the manifold, and a set of openings is formed in one face of the manifold for cooperation with a valve assembly, which openings provide communication between the load ports and the main flow passages through the valve assembly. The openings in the manifold cooperate with further openings in the valve assembly so as to permit the valve assembly to be mounted on the manifold in a selected one of two different positions, in which positions the valve assembly cooperates with the same set of openings in the manifold but results in the valve assembly functioning as a normally open or a normally closed valve. The same set of manifold openings also permits a four-way valve assembly to be mounted on the manifold.

14 Claims, 17 Drawing Figures

MANIFOLD AND VALVE SYSTEM

FIELD OF THE INVENTION

This invention relates to an improved control apparatus which comprises a combination of a manifold and a valve assembly and, in particular, to an improved mounting arrangement between the valve assembly and the manifold whereby a single set of openings as formed in the manifold is able to accommodate both three-way and four-way valves, which set of openings also permits the same three-way valve to be mounted on the manifold in two different orientations so that the three-way valve functions either as a normally closed or a normally open valve.

BACKGROUND OF THE INVENTION

Fluid control systems conventionally employ a manifold having a plurality of valve assemblies, such as three-way or four-way valve assemblies, mounted thereon for controlling the flow of a pressure fluid (such as air or oil) from a common pressure source to a plurality of different load devices, with the flow of pressure fluid to each load device being independently controlled by the respective valve assembly. While a fluid control apparatus employing a manifold and a plurality of valve assemblies is obviously desirable since it greatly simplifies the complexity of the piping arrangement, nevertheless the known fluid control apparatuses of this type have possessed structural and operational features which have made their usage less than desirable. For example, a conventional manifold is provided with a plurality of openings and passages associated therewith for permitting a plurality of valve assemblies to be mounted on the manifold. However, the openings are normally designed such that different types of valve assemblies are required in order to perform different flow control operations. For example, if two three-way valve assemblies are to be mounted on a conventional manifold with each valve assembly performing a different operation, that is, if one of the valve assemblies is a normally open valve and the other is a normally closed valve, then the known manifolds have permitted this type of operation only by requiring that different types of three-way valve assemblies being provided, one being designed solely for a normally closed operation and one being designed solely for a normally open operation. Needless to say, this severely restricts the flexibility and adaptability of the overall system, and also requires that a larger number of different types of valves be stocked in order to permit maintenance of the system and/or changing of the system to accommodate different load requirements. Also, many of the conventional manifolds have not readily accommodated both three-way and four-way valve assemblies.

In an attempt to improve the flexibility of fluid control systems, some manifolds have been formed from a plurality of separable sections, which sections have different porting arrangements associated therewith so as to accommodate different types of valves, such as a normally open three-way valve, a normally closed three-way valve, or a four-way valve. A plurality of such sections are then suitably connected together in the desired sequence to accommodate the desired number and selection of different valves. This arrangement of the manifold is obviously undesirable since it requires a large number of manifold configurations which are obviously costly to both manufacture and install. This manifold structure also increases the possibility of leakage within the system, and hence increases the maintenance of the system. In addition, a manifold assembled from a plurality of different sections does not provide the system with optimum flexibility, since any variation in the system can be accomplished only by disassembling the manifold and reassemblying the sections thereof so as to provide the desired valve connections.

Accordingly, it is an object of the present invention to provide an improved fluid control apparatus defined by a combination of a manifold and a plurality of valve assemblies mounted thereon, which fluid control apparatus overcomes the above-mentioned disadvantages. More specifically, it is an object of this invention to provide:

1. An apparatus, as aforesaid, wherein the manifold member has a porting arrangement associated therewith which readily accommodates a three-way valve assembly in two different orientations to thereby permit the same three-way valve assembly to function either as a normally open or a normally closed valve, without requiring any structural modification of either the manifold or the valve assembly.

2. An apparatus, as aforesaid, wherein the same porting arrangement also accommodates a four-way valve assembly, in addition to the three-way valve assembly as mentioned above.

3. An apparatus, as aforesaid, wherein the porting arrangement includes a plurality of identical sets of ports formed in the manifold, with each set of ports accommodating a three-way or a four-way valve assembly, as noted above, with the three-way valve assembly being selectively mounted on the manifold in two different orientations to thereby function as either a normally opened or a normally closed valve.

4. An apparatus, as aforesaid, wherein the cooperative porting arrangement between the manifold and the valve assembly provides the system with maximum flexibility by permitting a plurality of valve assemblies to be mounted on the manifold, with three-way and four-way valve assemblies being mounted on the same manifold and cooperating with different ones of the identical sets of ports.

5. An apparatus, as aforesaid, which greatly simplifies the installation of a fluid control system, which minimizes the chances of an improper hookup of the system, which minimizes the number of different valves which must be utilized in order to provide a maximum of valve functions, and which provides maximum flexibility by permitting the interchanging of different valve assemblies in an easy and efficient manner according to the needs of the external load devices.

6. An apparatus, as aforesaid, which is economical to manufacture, and requires little, if any, maintenance.

Other objects and purposes of the invention will be apparent to persons familiar with systems of this type upon reading the following specification and inspecting the accompanying drawings.

Figure 1:
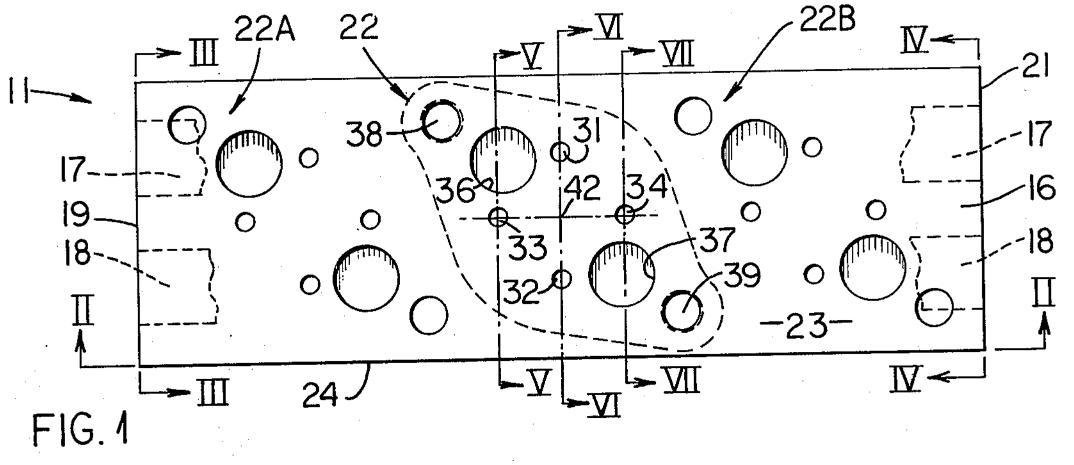
FIG. 1 is a top view of a manifold member according to the present invention.
Figure 2:
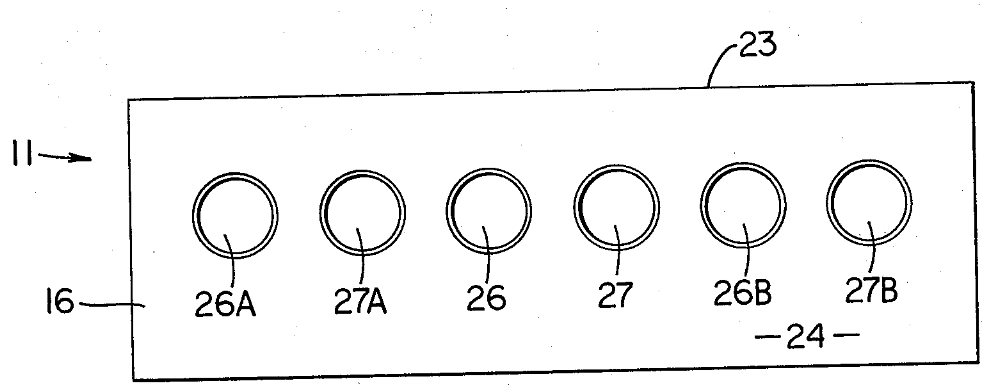
FIG. 2 is a front view of the manifold member taken substantially along the line II—II in FIG. 1.
Figure 3:
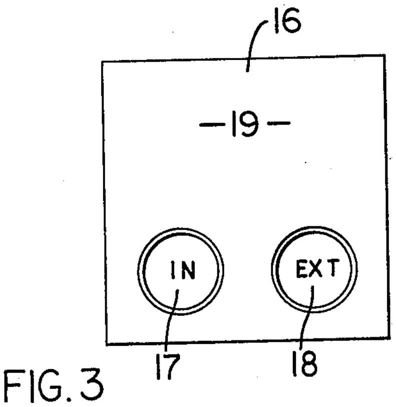
FIGS. 3 and 4 are end views taken respectively along the lines III—III and IV—IV in FIG. 1 and rotated 90°.
Figure 4:
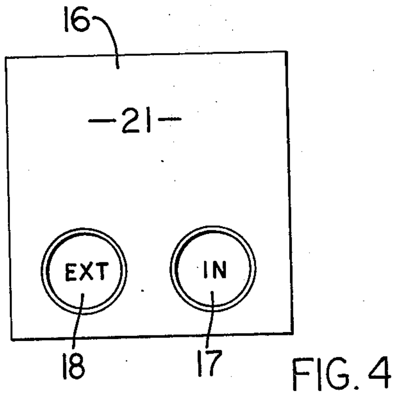

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the above-mentioned words, derivatives thereof and words of similar import.

SUMMARY OF THE INVENTION

The objects and purposes of the present invention, including those set forth above, have been met by providing a manifold member having a porting arrangement associated therewith which includes a pair of load ports and a set of openings adapted for cooperation with a valve assembly to provide fluid communication between the load ports and main supply and discharge passages formed in the manifold member. The set of openings, and the cooperative interconnections to the main passages and the load ports, cooperates with a three-way valve assembly such that the valve assembly can be selectively mounted on the manifold in two different orientations, a first of which permits the valve assembly to function as a normally opened valve, and the second of which permits the valve assembly to function as a normally closed valve. This same set of openings also permits a four-way valve assembly to be mounted on the manifold member. The manifold member is preferably provided with several identical porting arrangements therein, with each arrangement having its own pair of load ports and its own sets of openings for providing fluid interconnection between the load ports and the main passages through a respective valve assembly. The plural porting arrangements permits several valve assemblies to be mounted on the manifold member, with each valve assembly being either a four-way or a three-way valve, and with each three-way valve being selectively positionable on the manifold member to function as either a normally open or normally closed valve.

DETAILED DESCRIPTION

Figure 8:
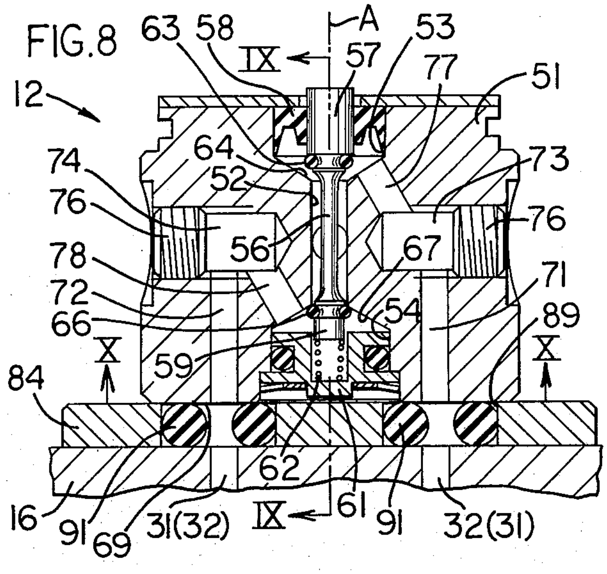
FIG. 8 is a central sectional view of a three-way valve assembly as taken substantially along the line VIII—VIII in FIG. 9.
Figure 9:
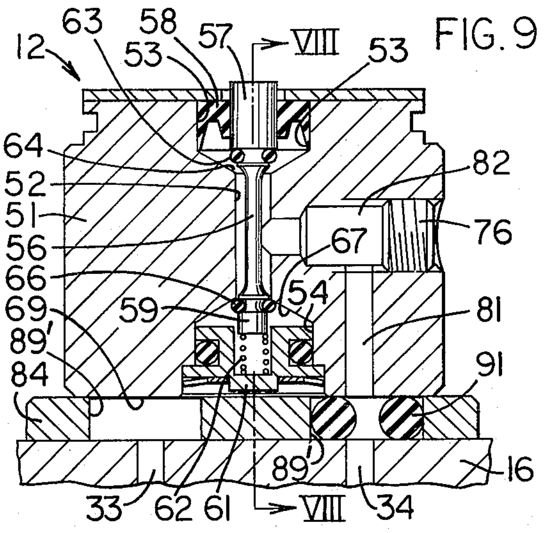
FIG. 9 is a central sectional view of the three-way valve assembly as taken along the line IX—IX in FIG. 8.
Figure 10:
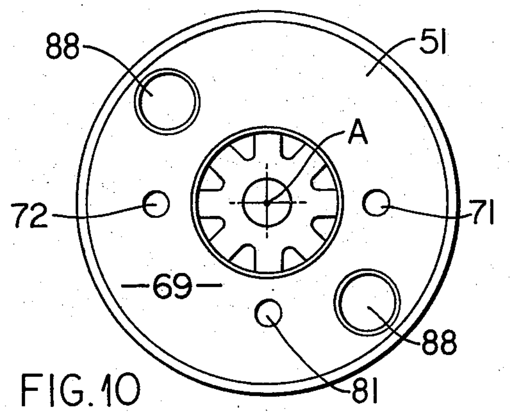
FIG. 10 is a bottom view as taken along the line X—X in FIG. 8.
Figure 13:
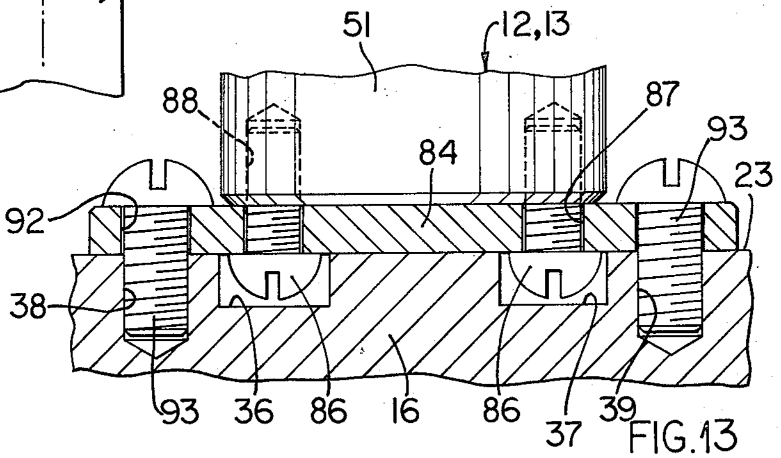
FIG. 13 is a fragmentary view, partially in cross section, of the connection between the valve assembly and the manifold.
Figure 15:
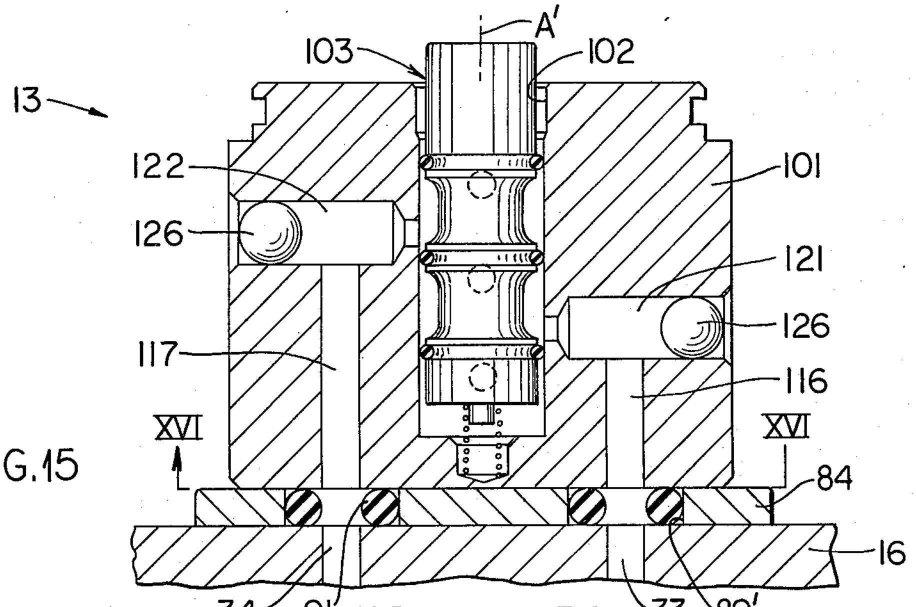
FIG. 15 is a central sectional view as taken along the line XV—XV in FIG. 14.
Figure 14:
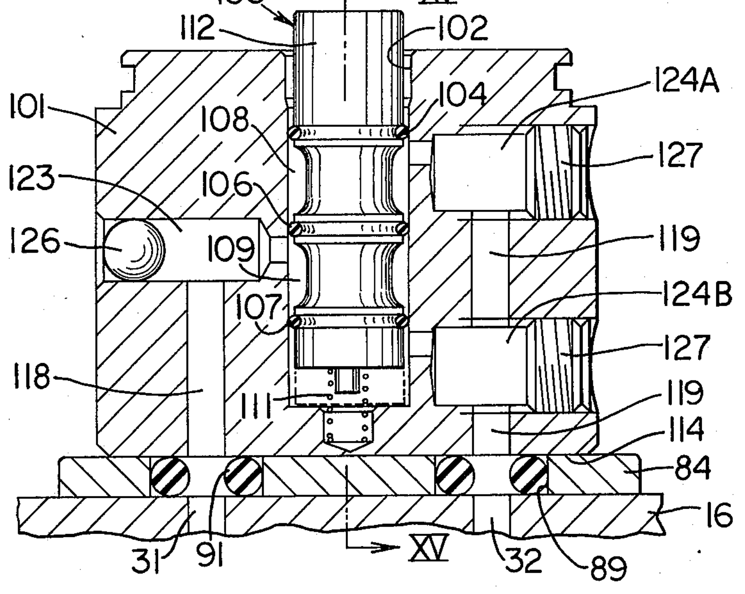
FIG. 14 is a central sectional view of a four-way valve assembly.

The fluid control apparatus of the present invention includes a manifold means 11 which is adapted to have one or more valve assemblies removably mounted thereon, such as a three-way valve assembly 12 as illustrated in FIGS. 8–10 or a four-way valve assembly 13 as illustrated in FIGS. 13–15.

Considering first the manifold means 11, as illustrated in FIGS. 1–7, same includes a manifold member 16 which preferably comprises a one-piece blocklike member formed from a suitable material, such as aluminum. The manifold member 16 has fluid supply and discharge passages 17 and 18, respectively, formed therein and extending longitudinally therethrough, which passages preferably terminate in threaded ports formed in the opposite end walls 19 and 21. The ports associated with the passages 17 and 18 in one of the end walls are connected to suitable external conduits (not shown), as conventional, whereas the ports at the opposite end of the manifold are normally closed by conventional threaded plugs.

Manifold member 16 is provided with a set of openings 22 extending inwardly from the top wall 23 thereof, which set of openings 22 has been enclosed by a dotted line in FIG. 1 for purposes of illustration. The front wall 24 of the manifold member has a pair of load ports 26 and 27 formed therein, which ports are preferably threaded. The ports 26 and 27 cooperate with the set of openings 22 as described hereinafter.

As indicated in FIG. 1, the manifold member 16 as illustrated is designed to accommodate three different valve assemblies, for which purpose the manifold member is provided with two additional sets of openings formed therein, which additional sets are identical to the set 22 and have been designated 22A and 22B. Additional load ports 26A–27A and 26B–27B are formed in the front wall of the manifold for association with the sets 22A and 22B, respectively.

Figure 5:
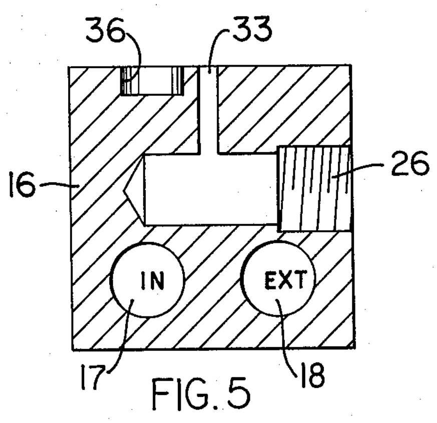
FIGS. 5, 6 and 7 are sectional views of the manifold taken respectively along the lines V—V, VI—VI and VII—VII in FIG. 1 and rotated 90°.
Figure 6:
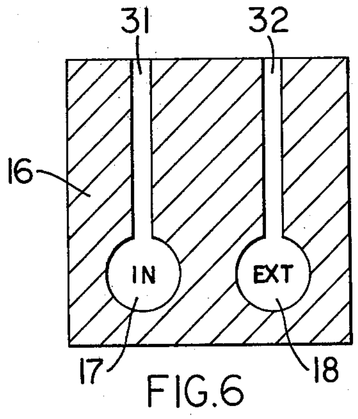
Figure 7:
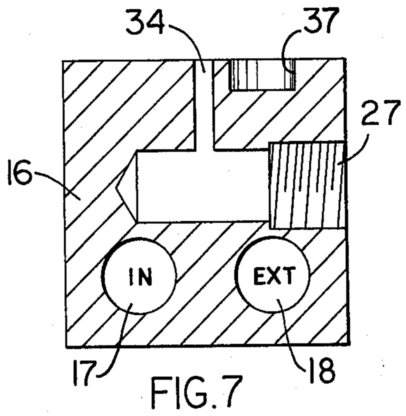

The set of openings 22 includes four passageways 31–34 of substantially equal diameter, which passageways project downwardly into the manifold member in substantially perpendicular relationship to the top wall 23. The lower ends of the passageways 31 and 32 communicate with the supply and discharge passages 17 and 18, respectively, as shown in FIG. 6. Passageways 33 and 34, respectively, communicate with the load ports 26 and 27 as indicated in FIGS. 5 and 7.

Set 22 also includes a pair of identical openings or blind bores 36 and 37 formed therein, which bores are of substantially larger diameter than the passageways 31–34. Set 22 still further includes a pair of identical threaded holes 38 and 39. The holes 38–39 and bores 36–37 also extend inwardly from the top wall 23.

Figure 1A:
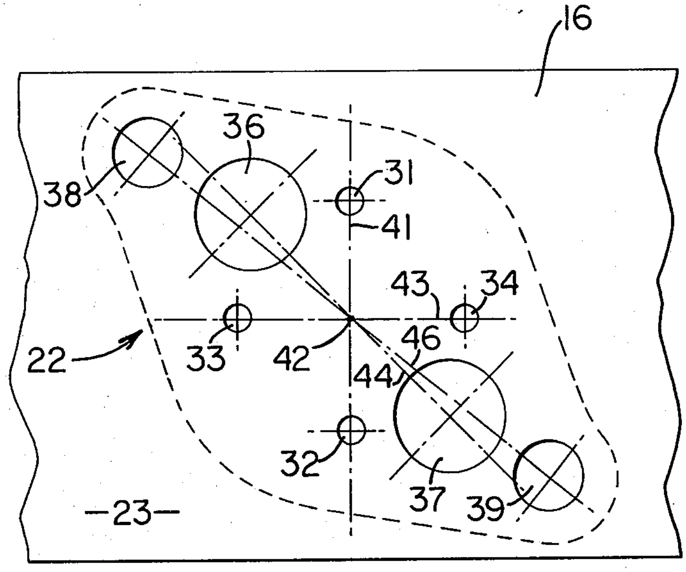
FIG. 1A is an enlarged diagrammatic view of one set of openings as formed in the manifold member.

As illustrated on an enlarged scale in FIG. 1A, the pair of identical passageways 31–32 lie on a line 41 which extends substantially perpendicular to the longitudinal direction of the manifold member. The individual passageways 31 and 32 are disposed equal distances from a point 42, which point 42 constitutes the midpoint of the line 42 and also effectively constitutes the center of the set of openings 22. The remaining pair of identical passageways 33 and 34 lie on a further line 43 which extends at an angle to the line 41 and intersects same at the center or midpoint 42. The passageways 33 and 34 are also equally spaced on opposite sides of the center 42.

The embodiment illustrated in FIGS. 1 and 1A discloses the passageways 31–34 as being located substantially on a square pattern whereby the lines 41 and 43 extend perpendicular to one another, with the passageways 31–34 all being spaced the same distance from the center point 42. However, the present invention can also be carried out utilizing other geometric patterns wherein the lines 41 and 43 are not perpendicular to one another, so long as the openings of each pair 31–32 and 33–34 are disposed equal distances from and on diametrically opposite sides of the center point 42. In addition, the openings of the pair 31–32 can be spaced from the center point 42 by a distance which is different from the spacing between the center point 42 and the individual openings of the pair 33–34.

The pair of blind bores 36 and 37 are also located on a line 44 which extends through the center point 42, which point 42 also constitutes the midpoint of the line 44 so that the bores 36 and 37 are equally spaced from and on diametrically opposite sides of the point 42. The threaded holes 38–39 are also disposed on a line 46 which extends through the center point 42, which center point also functions as the midpoint of the line 46 so that holes 48 and 49 are equally spaced from and on diametrically opposite sides of the point 42. The lines 44 and 46, in the illustrated embodiment, each extend at an angle relative to the lines 41 and 42 and, as indicated in FIG. 1, the lines 44 and 46 extend at an angle of approximately 45° relative to the lines 41 and 43. The lines 44 and 46 are themselves slightly angled relative to one another. This positional arrangement facilitates mounting of the valve assemblies on the manifold member while occupying a minimum of space.

Considering now the three-way valve assembly 12 as illustrated in FIGS. 8–10, same includes a substantially cylindrical housing 51 having a central elongated passageway 52 formed therein, which passageway extends along the longitudinal axis A of the housing. Passageway 52 terminates in enlarged chambers 53 and 54 disposed adjacent the opposite ends of the housing. An elongated valve rod 56 is slidably disposed within the passageway 52, which rod is of substantially smaller diameter than the passageway so as to define an annular flow passage in surrounding relationship thereto. The upper end of rod 56 has an enlarged portion 57 which is slidably supported on a seal member 58 mounted within and sealingly closing the outer end of the chamber 53. The rod portion 57 projects outwardly so as to be positioned for engagement with a suitable control or actuating device, such as a solenoid.

The other end of valve rod 56 has a cylindrical portion 59 thereon which is slidably guided by means of an end cap 61 which is stationarily disposed within the chamber 54 and is sealingly connected to the housing 51. A conventional compression spring 62 coacts between the end cap 61 and the rod portion 59 so that the valve rod 56 is normally urged into its uppermost position as illustrated in FIGS. 8 and 9.

Valve rod 56 has a seal ring 63 mounted thereon and disposed for sealing engagement with the tapered wall 64 formed at the lower end of the chamber 53. A similar seal ring 66 is mounted on the valve rod adjacent the other end thereof and is adapted to sealingly engage a tapered wall 67 associated with the lower chamber 54.

Cylindrical valve hosing 51 has a pair of axially extending passages 71 and 72 formed therein, which passages extend upwardly from the end wall 69 and communicate with ports 73 and 74, respectively. Ports 73 and 74 extend radially into the housing from substantially diametrically opposite sides thereof, and the radially outer ends of the ports are suitably closed, as by a conventional plug 76. A connecting hole 77 is formed internally of the housing so as to effect communication of the port 73 with the upper chamber 53, and a similar connecting hold 78 is formed in the housing for joining the other port 74 to the lower chamber 54.

A further passage 81 projects axially into the housing from the end wall 69 thereof, which passage 81 communicates with a further radial port 82 which is formed in the sidewall of the housing, which radial port 82 is disposed circumferentially midway between the ports 73 and 74. The radially outer end of port 82 is also closed as by a plug 76. The port 82 extends radially inwardly and communicates directly with the central passageway 52.

In the three-way valve assembly 12, as described above, the passage 81 always functions as a load passage, that is, it is adapted for interconnection to the external device or apparatus to which pressurized fluid is being supplied. On the other hand, the passages 71 and 72 function as the supply and discharge passages for the fluid, with the function of these passages being interchangeable. For example, when pressure fluid is supplied to the passage 71, it flows past the open seal ring 63 into the load passage 81, which passage is isolated from the passage 72, so that the three-way valve is thus in a normally open position. On the other hand, when pressure fluid is supplied to the passage 72, the passage 72 is normally isolated from the load passage 81 by the seal ring 63 so that the valve under these conditions functions as a normally closed valve.

Regarding the passages 71, 72 and 81 as formed in the valve housing 41, they are positioned so as to be alignable with a selected three of the four passageways 31–34 as formed in the manifold member. For this reason, the passages 71 and 72 are disposed on diametrically opposite sides of the axis A and are spaced equally on opposite sides of the axis A by a distance equal to the spacing between the individual passageways 31 and 32 and the center 42. The passage 81 lies in a plane which is perpendicular to the plane of the passages 71 and 72 and extend through the axis A, with the passage 81 being spaced from the axis A by a distance equal to the spacing from the center point 42 to either of passageways 33 or 34.

To mount the valve assembly 12 on the manifold member 16, the valve assembly is provided with an adapter plate 84 fixedly connected to the end face 69 of the valve housing 51. Adapter plate 84 is fixed to the valve housing by a pair of screws 86 (FIG. 13) which extend through a pair of openings 87 formed in the adapter plate and engage within a pair of threaded openings 88 as formed in the axial end of the valve housing. The openings 87 in the adapter plate and the openings 88 in the valve housing are spaced apart by a distance substantially equal to the spacing between the bores 36 and 37 formed in the manifold, whereby when the adpater plate is positioned on the top wall 23 of the manifold, as illustrated in FIG. 13, the heads of the screws 86 will be accommodated within the bores 36 and 37.

Figure 11:
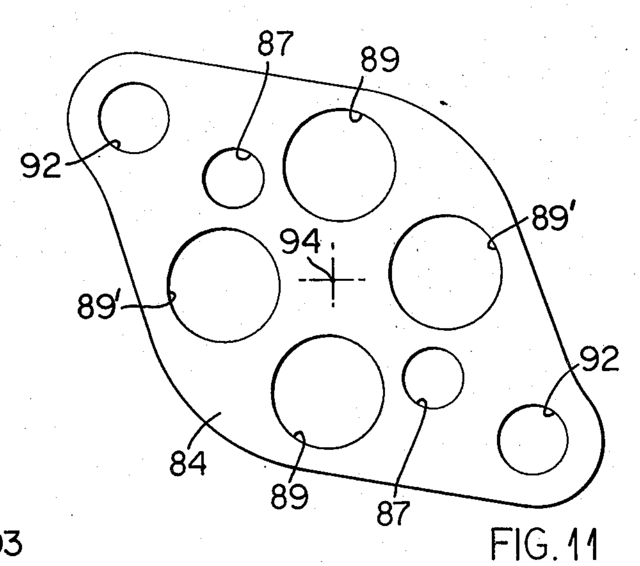
FIG. 11 is a plan view of the adapter plate attached to the valve assembly for mounting same on the manifold member.

Adapter plate 84 also has two substantially identical pairs of openings 89 and 89' extending therethrough, which openings are positioned relative to a center point 94 (FIG. 11) so as to be alignable with the passageways 31–34 formed in the manifold member. That is, the openings 89 are equally spaced from and on diametrically opposite sides of the point 94, with the spacing between openings 89 being substantially equal to the spacing between passageways 31 and 32 so that openings 89 will thus align with passageways 31 and 32 when the valve assembly is mounted on the manifold member, as illustrated in FIG. 8. The other two openings 89' are similarly equally spaced from and on diametrically opposite sides of the center point 94 and are spaced apart by distance equal to the spacing between passageways 33 and 34 so as to be substantially alignable therewith in the manner illustrated in FIG. 9. Each of the openings 89 and 89' is adapted to receive therein a conventional elastomeric O-ring for creating a sealed realtionship between the valve housing and the manifold member.

A further pair of openings 92 is formed in and extends through the adapter plate 84. These openings are spaced outwardly from the outer periphery of the cylindrical valve housing 51, whereupon suitable fastening devices, such as screws 93, extend through the openings 92 and threadably engage the threaded holes 38 and 39 formed in the manifold member 16 for fixedly attaching the valve assembly 12 to the manifold member.

ASSEMBLY AND OPERATION

While the operation and assembly of the fluid control apparatus (that is, the valve-manifold combination) according to the present invention is believed self-evident from the above description, nevertheless, same will be briefly described to insure a complete understanding thereof.

To mount the three-way valve assembly 12 on the manifold member 16, the adapter plate 84 (which is already fixed to the valve housing 51 by the screws 86) is positioned so as to bear against the top wall 23 of the manifold in overlying relationship to the set of openings 22. Prior to positioning of the adapter plate on the manifold, appropriate elastomeric seal rings 91 are disposed within the openings 89 and 89'.

Depending upon the mode of control operation desired, the valve assembly 12 and its attached adapter 84 can be mounted on the manifold 16 in two different orientations which are angularly displaced from one another by an angle of 180° as measured about the axis A of the valve assembly. These two possible operating conditions of the valve assembly 12, and the respective mounting of the valve assembly on the manifold so as to achieve these two conditions, will now be explained.

If the valve assembly is to be a "normally closed" valve so that pressure fluid will, under normal conditions, be prevented from being supplied to the external load, then the valve assembly will be mounted on the manifold in an orientation substantially as illustrated in FIGS. 8 and 9. That is, the valve assembly will be positioned so that the axis A thereof will be substantially aligned with the imaginary center point 42, and the valve assembly will be oriented such that the passages 71 and 72 are respectively aligned with the passages 32 and 31 in the manifold member. This orientation of the valve assembly will result in the passage 81 thereof being aligned with the passage 34 in the manifold. When aligned as described above, then the screws 93 are used for fixedly securing the valve assembly to the manifold.

When oriented as described above, pressure fluid will flow through the supply passage 17 into the passage 31, and then through the passage 72, port 74 and connecting hole 78 into the lower end chamber 54. Since spring 62 maintains the valve rod in its upper position so that seal ring 66 engages the tapered wall 67, the lower chamber 54 is thus isolated from the load passageway 81. However, the load passageway 81 is in open communication with the passageway 71 since seal ring 63 is spaced from the lower tapered wall 64 of the upper chamber 53. The passage 71 in turn communicates with the passageway 32 which then communicates with the exhaust or discharge passage 18. When pressurized fluid is to be supplied to the external load device, such as a fluid pressure cylinder, then the valve assembly is displaced from its normally closed position, as by means of a solenoid, whereby valve rod 56 moves downwardly so that seal ring 63 engages the wall 64 and isolates the load passage 81 from the exhaust passage 71, while at the same time lower seal ring 66 also moves downwardly so that pressure fluid flows from lower chamber 54 into passageway 52 and is then supplied to the load passage 81. The pressure fluid flows through load passage 81 and through the passageway 34 into the load port 27, which load port is connected to the external load device by means of a conventional intermediate conduit or pipe.

While the above description relates to a normally closed valve operation, the described assembly can also be made to perform a "normally open" valve operation. To operate in this manner, the valve assembly 12 is angularly displaced relative to the manifold 16 through an angle of 180° about the valve axis A. When so angularly displaced, this again results in the appropriate openings 92 in the adapter plate being aligned with the threaded openings 38 and 39 in the manifold member to thereby permit the valve assembly to be secured to the manifold member by screws 93. With the valve assembly secured to the manifold in this latter position, the passages 71 and 72 in the valve are now respectively aligned with the passageways 31 and 32, which orientation has been represented by the numerals 31 and 32 enclosed within parenthesis in FIG. 8. This orientation also results in passageway 81 now being aligned with the passageway 33. Accordingly, the pressure fluid supplied to the main supply passage 17 will flow through passageway 31 into the passage 71, and thence through port 73, hole 77, upper chamber 53, passageway 52 and port 82 into the load passage 81. The pressure fluid will then flow from passage 81 through passageway 33 into the load port 26, which load port 26 is connected to a load device by means of a conventional conduit. Pressure fluid will thus be supplied to the load device whenever the valve is in its normal position. When in this normal position, the passage 72 communicates with the passageway 32 as joined to the discharge passage 18, but the passage 72 is isolated from the load passage 81. However, when the valve is shifted downwardly in opposition to the urging of the spring 62, then the load passage 81 will be isolated from the supply passage 71, but will be in communication with the discharge passage 72 to thereby discharge the pressure fluid from the external load device.

Thus, the valve assembly 12 and manifold 11 can be utilized to provide either a normally open or a normally closed valve operation merely by the selective positioning of the valve assembly of the manifold, and without requiring any structural modifications of either the valve assembly or the manifold. To provide a normally open operation, the valve assembly is mounted on the manifold so that passages 71 and 72 are aligned with the passageways 31 and 32, respectively, and the conduit from the load device is connected to load port 26, which is the "normally open" load port. On the other hand, when a "normally closed" valve operation is desired, then the valve assembly is mounted on the manifold in a second position which is displaced 180° from the first position described above, in which second position the passages 71 and 72 respectively communicate with the passageways 32 and 31, and the external conduit from the load device is connected to the load port 27.

This selection over the valve operation, dependent upon the positional mounting of the valve assembly on the manifold, is made possible by the arrangement of the individual openings within the set 22, and the cooperative arrangement of the corresponding openings formed in the adapter plate 84 and in the axial end of the valve housing 51. While the present invention encompasses the specifically described arrangement of the openings, it also encompasses many variations of this arrangement which still permit the desired alternate mounting of the valving assembly in two different positions so as to provide for either a normally opened or a normally closed valve operation. For example, so long as each cooperative pair of openings is disposed equally spaced from and on diametrically opposite sides of a common center point for the set of openings, then the desired two-position mounting of the valve assembly on the manifold will be possible.

While the present invention is obviously applicable to a manifold which is able to accommodate only a single valve assembly thereon, nevertheless the manifold is preferaly large enough so as to accommodate a plurality of valve assemblies (three in the illustrated embodiment) so that a single manifold having a plurality of valve assemblies thereon can thus be utilized for controlling the flow of pressure fluid from a common source to a plurality of different load devices. By using the illustrated manifold, three different valve assemblies can be mounted on the manifold so as to permit the individual control over the flow of pressure fluid from a common source to three different load devices. Further, each of the individual valve assemblies, such as the three-way valve assembly 12, can be selectively mounted on the manifold so as to provide either a normally open or a normally closed operation.

Figure 16:
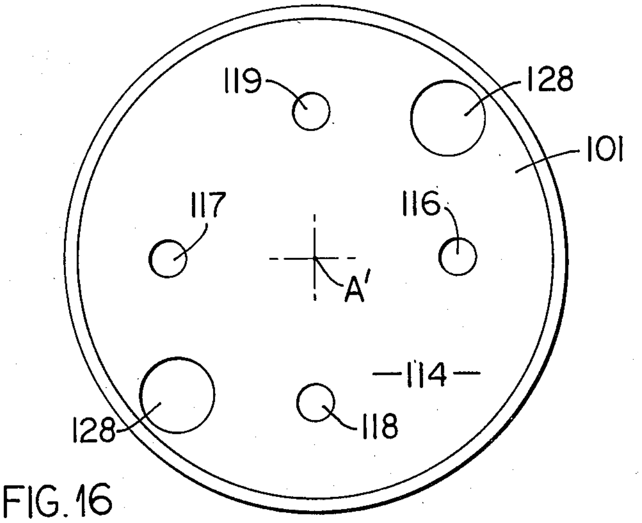
FIG. 16 is a view taken along the line XVI—XVI in FIG. 15.

The manifold means 11 of the present invention is also desirable since, in addition to its ability to mount thereon a three-way valve in two different positions, it can additionally mount thereon a four-way valve without requiring any structural modification of either the manifold or the four-way valve assembly. A four-way valve assembly 13 which is capable of being mounted on the manifold means 11 is illustrated in FIGS. 14–16, as described below.

The four-way valve assembly 13 includes a substantially cylindrical valve housing 101 having an elongated bore 102 extending axially thereof, which bore has a valve spool 103 slidably supported therein. A plurality of conventional elastomeric seal rings 104, 106 and

107 are mounted on the valve spool and are disposed in sliding and sealing engagement with the wall of the bore 102. These elastomeric seal rings define a pair of axially spaced, annular flow passages 108 and 109 therebetween in surrounding relationship to the valve spool. A spring 111 coacts between the housing and the lower end of the valve spool for normally maintaining same in its uppermost position, in which position the upper end portion 112 of the valve spool projects outwardly of the housing and is adapted to be engaged with a suitable operator, such as a solenoid, for permitting downwardly shifting of the valve spool when desired.

The valve housing 101 has a pair of identical passages 116 and 117 extending axially upwardly from the lower end face 114, which passages 116 and 117 are equally spaced from and disposed on diametrically opposite sides of the longitudinal axis A'. A further pair of passages 118 and 119 also extend axially of the valve housing and are likewise disposed equally spaced from and on diametrically opposite sides of the axis A'. The passages 116–119 are geometrically and dimensionally positioned in a manner identical to the positional relationship of the passages 31–34 as formed in the manifold member 16.

The passages 116 and 117 respectively communicate with ports 121 and 122 formed in the valve housing, which ports are disposed on substantially diametrically opposite sides of the valve housing but are displaced axially from one another. These ports each extend radially inwardly so as to communicate with the bore 102 at axially spaced locations. The passage 118 communicates with a similar radial port 123 which is spaced circumferentially midway between the ports 121 and 122. The port 123 also extends radially inwardly so as to communicate with the bore 102 at a location which is disposed axially between the ports 121 and 122. The remaining passage 119 similarly communicates with a radial exhaust port formed in the valve housing, which exhaust port in the illustrated embodiment is divided into two separate external ports 124A and 124B, both of which extend radially so as to communicate with the bore 102 at locations disposed adjacent the opposite ends thereof. The ports 124A and 124B are disposed axially outwardly of the ports 121, 122 and 123.

Each of the ports 121, 122 and 123 has the radially outer end thereof closed by any suitable plug structure, such as a conventional threaded plug. However, in the illustrated embodiment, the ports are closed by a spherical element 126 which is suitably soldered into the outer end of the respective port. The exhaust port 124A and 124B can also be suitably closed, if desired, by a suitable plug 127 if exhausting of the pressure fluid through the manifold is desired. However, if exhausting of the pressure fluid (such as air) into the atmosphere is acceptable, then the plugs 127 can be removed.

The valve housing 101 also has a pair of threaded holes or openings 128 formed axially therein from the lower end face 114, which openings 128 are equally spaced from and on diametrically opposite sides of the axis A'. These openings 128 are geometrically and dimensionally positioned relative to the passages 116–119 in a manner identical to the geometrical and dimensional relationship of the bores 37–38 relative to the passageways 31–34.

Figure 12:
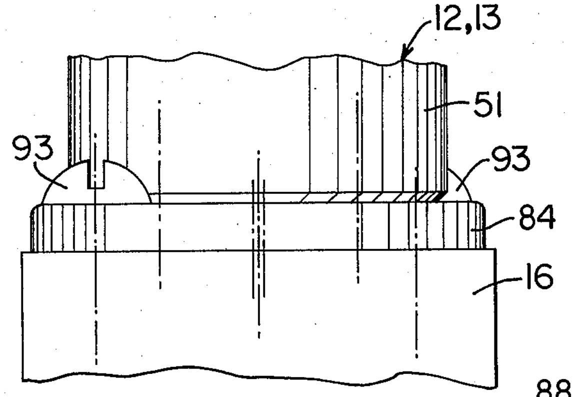
FIG. 12 is a fragmentary view illustrating a valve assembly as mounted on the manifold member.

To mount the four-way valve assembly 13 on the manifold 16, the valve housing 101 is provided with the previously described adapter plate 84 fixedly secured to the lower end face 114 thereof, which adapter plate is mounted to the valve housing by means of suitable screws which engage the openings 128, and which srews have the heads thereof accommodated in the bores 36 and 37 of the manifold member. The valve assembly, and its adapter plate, is then positioned so that the adapter plate can be fixedly secured to the manifold by means of the screws 93 coacting with the threaded openings 38 and 39 formed in the manifold member in substantially the same manner as illustrated in FIG. 12. When mounted on the manifold member in this manner, the passage 116, 117, 118 and 119 will be respectively aligned with the manifold passageways 34, 33, 31 and 32. Pressure fluid from the source will thus flow through the passageways 31 and 118 to the port 123, whereby pressure fluid will be supplied to the port 121 and thence through the load passage 116 and passage 33 to the load port 26. The other load port 27 will be connected through the passageway 34 and passage 117 to the exhaust port 124A, which exhaust port can either exhaust directly or can exhaust through passageways 119 and 32 to the main discharge passage 18.

On the other hand, when the spool valve is shifted downwardly against the urging of spring 111, then the connections to the two load ports will be reversed so that pressure fluid will flow from port 123 into port 122, which communicate with the load port 27, whereas the previously pressurized load port 26 now communicates through passageways 33 and 116 and port 121 with the lower exhaust port 124B.

Thus, the manifold member 16 of the present invention is not only suitable for mounting a three-way valve assembly in two operational positions, but the same mounting arrangement on the manifold also readily accommodates a four-way valve assembly. Thus, any desired combination of three-way and/or four-way valve assemblies can be selectively oriented and positioned on the manifold member.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fluid control apparatus, comprising in combination:

manifold means comprising a manifold member having first, second, third and fourth flow passages formed therein, said manifold member also having an exterior mounting face formed thereon;

said first passage being adapted for connection at one end thereof to a source of fluid and communicating with a first opening formed in said mounting face, said second passage being adapted for exhausting the fluid from one end thereof and communicating with a second opening formed in said mounting face;

said third passage terminating at one end thereof in a first load port adapted for connection to an external load and terminating at the other end thereof in a third opening formed in said mounting face, said fourth passage terminating at one end thereof in a second load port adapted for connection to an external load and terminating at the other end thereof in a fourth opening formed in said mounting face;

a valve assembly interchangeably mounted on said manifold member in either of first and second positions for controlling the flow of fluid from said first passage through said valve assembly into said third and fourth passages, respectively;

said valve assembly including a valve hosing having an exterior support face thereon disposed directly opposite and adjacent said mounting face when said valve assembly is mounted on said manifold member, said valve housing having at least first, second and third passageways formed therein which respectively terminate in first, second and third holes at said support face;

said valve assembly also including valve means movably supported in said valve housing for controlling the flow of fluid between said passageways, said valve means being normally maintained in the first location preventing flow between said first and third passageways while permitting flow between said second and third passageways, said valve means being movable into a second location permitting flow between said first and third passageways while preventing flow between said second and third passageways;

said third and fourth openings as formed in said mounting face being disposed on opposite sides of and equally spaced from the midpoint of a line joining said first and second openings;

said first and second holes as formed in said support face being spaced apart by a distance equal to the spacing between said first and second openings, and said third hole being spaced from and positioned relative to said first and second holes in a manner identical to the distance and positional relationship of said third opening relative to said first and second openings; and connecting means coacting between said valve assembly and said manifold member for selectively fixedly connecting said valve housing to said manifold member in either (1) said first position wherein said first, second and third openings are respectively aligned with said first, second and third holes, or (2) said second position wherein said first, second and fourth openings are respectively aligned with said second, first and third holes.

2. A fluid control apparatus according to claim 1, wherein said first and second positions of said valve assembly relative to said manifold member are angularly spaced apart by an angle of approximately 180° generated about an axis of said valve assembly which intersects said midpoint and extends perpendicular to said mounting face.

3. A fluid control apparatus according to claim 2, wherein said valve assembly includes mounting means fixedly associated with said valve housing for fixedly but detachably mounting said valve assembly on said manifold member, said manifold member having a pair of mounting holes formed therein and extending inwardly from said mounting face, said mounting holes being located on a second line which passes through the midpoint of said first-mentioned line, said mounting holes being located on opposite sides of and equally spaced from said midpoint, and said connecting means including a pair of threaded fastening elements extending from said valve assembly into said mounting holes.

4. A fluid control apparatus according to claim 3, wherein said mounting means includes an adapter plate fixedly but removably connected to the support face of said valve housing, said adapter plate being adapted to be disposed in engagement with said mounting face on said manifold member, said adapter plate being removably connected to said valve housing by a pair of threaded fasteners.

5. A fluid control apparatus according to claim 4, wherein said adapter plate has at least three enlarged openings formed therethrough and positioned so as to be individually aligned with said first, second and third holes, each of said enlarged openings having a resilient seal ring disposed therein for creating a sealed engagement with said mounting face and said support face.

6. A fluid control apparatus according to claim 1, wherein said valve assembly comprises a four-way valve and includes a fourth passageway formed therein and terminating in a fourth hole spaced from and positioned relative to the other holes in a manner identical to the distance and positional relationship of said fourth opening relative to the other openings, and said valve means permitting flow between said first and fourth passageways when in said first location and preventing flow between said first and fourth passageways when in said second location.

7. A fluid control apparatus according to claim 1, wherein said manifold member includes a first exterior face extending substantially perpendicular to said mounting face, said first and second load ports being formed in said first exterior face, said manifold member including a second exterior face which is substantially perpendicular to both said mounting face and said first exterior face, and said first and second flow passages terminating in ports formed in said second exterior face.

8. A fluid control apparatus according to claim 1, wherein said manifold member comprises a one-piece, elongated, block-like member having said first and second passages formed therein and extending longitudinally thereof, said mounting face comprising one of the sidewalls of said manifold member, said first and second loads ports being formed in a further of the sidewalls of said manifold member, a fifth passage formed in said manifold member for joining said first opening to said first passage, a sixth passage formed in said manifold member for joining said second opening to said second passage;

said third, fourth, fifth and sixth passages, said first and second load ports, and said first, second, third and fourth openings comprising a porting arrangement adapted for cooperation with a single said valve assembly as mounted on said manifold member;

said manifold member including a second porting arrangement formed therein which is identical to said first-mentioned porting arrangement and is spaced therefrom in the longitudinal direction of said manifold member, said second porting arrangement also being connected to said first and second passages, and said second porting arrangement being adapted to cooperate with a second valve assembly which can be interchangeably mounted on said manifold member.

9. Manifold means adapted to have a plurality of valve assemblies mounted thereon for controlling the flow of pressure fluid from a source to a plurality of external load devices, said manifold means comprising:

a one-piece manifold member having first and second elongated passages formed therein, said first and second passages terminating in a pair of ports, one of said ports being adapted for connection to a fluid pressure source and the other port functioning as an exhaust port for the pressure fluid;

said manifold member having a plurality of identical porting systems formed therein, each porting system being adapted for connection to a load device and to a separate valve assembly, each said porting system also being in fluid communication with said first and second passages;

said porting system comprising first and second flow passageways formed in said manifold member and respectively communicating at one end thereof with said first and second passages, said first and second passageways respectively terminating at the other end thereof in first and second openings formed in one of the faces of said manifold member;

said manifold member having third and fourth passageways formed therein and respectively terminating at one end thereof in third and fourth openings formed in said one face of said manifold member, the other end of said third and fourth passageways respectively terminating at first and second load ports which are adapted for connection to an external load device; and said third and fourth openings as formed in said one face being disposed on opposite sides of and equally spaced from the midpoint of a straight line joining said first and second openings.

10. A manifold means according to claim 9, wherein said plurality of porting systems are spaced from one another in the longitudinal direction of said manifold member, said one face comprising one of the sidewalls of said manifold member, and said loading ports being formed in a sidewall of said manifold member which is different from said one sidewall.

11. A manifold means according to claim 10, wherein said manifold member has a pair of threaded holes formed in said one sidewall and disposed for association with each said porting system, said pair of threaded holes being disposed on opposite sides of and equally spaced from said midpoint, said threaded holes permitting a valve assembly to be attached to said manifold member.

12. A manifold means according to claim 10, wherein said first, second, third and fourth passageways all extend in a direction substantially perpendicular to the direction of said first and second passages, and wherein said first and second load ports are formed in a second sidewall of said manifold member which is substantially perpendicular to said one sidewall.

13. A fluid control apparatus for controlling the flow of pressure fluid from a source to a plurality of external load devices, comprising in combination:

a one-piece manifold member having first and second elongated passages formed therein, said first and second passages terminating in a pair of ports, one of said ports being adapted for connection to a fluid source and the other port functioning as an exhaust port for the pressure fluid;

said manifold member having a plurality of identical porting systems formed therein and each being adapted for connection to a load device and to a separate valve assembly, each said porting system also being in fluid communication with said first and second passages;

each said porting system comprising first, second, third and fourth flow passageways formed in said manifold member and respectively terminating at one end thereof in first, second, third and fourth openings formed in one of the faces of said manifold member;

said first and second flow passageways as associated with each said porting system respectively communicating at the other end thereof with said first and second passages, and said third and fourth passageways at the other end thereof respectively terminating at first and second load ports which are adapted for connection to an external load device;

said first, second, third and fourth openings as associated with each said porting system and as formed in said one face being disposed so that the third and fourth openings are positioned on opposite sides of and equally spaced from the midpoint of a straight line joining said first and second openings, said third and fourth openings being joined by a second straight line which passes through said midpoint;

first and second valve assemblies mounted on said manifold member and repectively disposed for cooperation with first and second ones of said porting systems, each of said valve assemblies being of a unitary construction so as to be independently and interchangeably mounted on and removable from the manifold member;

each said valve assembly having movable valve means disposed therein and first, second and third passageways associated with said valve means whereby said valve means controls flow between said passageways;

said first, second and third passageways as associated with each valve assembly terminating respectively in first, second and third holes formed in one of the surfaces of said valve assembly, said surface being disposed opposite the face of the manifold when the valve assembly is mounted thereon;

the first and second holes as formed in said surface being spaced apart by a distance equal to the spacing between said first and second openings, and said third hole being spaced from and positioned relative to said first and second holes in a manner identical to the distance and positional relationship of said third opening relative to said first and second openings; and connecting means coacting between each said valve assembly and said manifold member for selectively fixedly connecting each said valve assembly to said manifold member in either (1) a first position wherein said first, second and third openings are respectively aligned with said first, second and third holes, or (2) a second position wherein said first, second and fourth openings are respectively aligned with second, first and third holes.

14. A fluid control apparatus according to claim 13, wherein said connecting means includes a pair of mounting holes formed in said manifold member and associated with each said porting system, said mounting holes being formed in said face and being located on a third straight line which passes through the midpoint of said first-mentioned line, said mounting holes being located on opposite sides of and equally spaced from said midpoint, said connecting means also including a pair of threaded fastening elements extending from said valve assembly into said mounting holes for fixedly connecting said valve assembly to said manifold member, and said first and second positions of said valve assembly relative to said manifold member being angularly spaced apart by an angle of approximately 180° generated about an axis of said valve assembly which intersects said midpoint and extends substantially perpendicular to said face.

* * * * *

UNITED STATES PATENT AND TRADEMARK OFFICE

CERTIFICATE OF CORRECTION

PATENT NO. : 3 993 091

DATED : November 23, 1976

INVENTOR(S) : Stanley M. Loveless

It is certified that error appears in the above-identified patent and that said Letters Patent are hereby corrected as shown below:

Column 12, line 8; "hosing" should read ---housing---.

Column 13, line 43; "loads" should read ---load---.

Column 16, line 20; "with second" should read ---with said second---.

Signed and Sealed this

Twenty-ninth Day of March 1977

[SEAL]

*Attest:*

RUTH C. MASON
*Attesting Officer*

C. MARSHALL DANN
*Commissioner of Patents and Trademarks*